United States Patent [19]

Baker et al.

[11] Patent Number: 4,902,095
[45] Date of Patent: Feb. 20, 1990

[54] OPTICAL FIBRE CABLE CONNECTOR

[75] Inventors: James C. Baker, Lechlade, United Kingdom; Geraldine M. Lang, Bishopbriggs, Scotland; Stephen A. Clift, Swindon, England; Leslie J. Allen, Menlow Park, Calif.

[73] Assignee: Focas Limited, United Kingdom

[21] Appl. No.: 132,308

[22] Filed: Dec. 15, 1987

[30] Foreign Application Priority Data

Dec. 17, 1986 [GB] United Kingdom ............... 8630058
Nov. 2, 1987 [GB] United Kingdom ............... 8725639

[51] Int. Cl.⁴ .............................................. G02B 6/38
[52] U.S. Cl. ............................. 350/96.21; 350/96.20
[58] Field of Search ............... 350/96.20, 96.21, 96.22

[56] References Cited

U.S. PATENT DOCUMENTS

| | | | |
|---|---|---|---|
| 4,198,119 | 4/1980 | Uberbacher | 350/96.20 |
| 4,261,644 | 4/1981 | Giannaris | 350/96.21 |
| 4,290,668 | 9/1981 | Ellis et al. | 350/96.21 |
| 4,404,010 | 9/1983 | Bricheno et al. | 350/96.21 |
| 4,411,491 | 10/1983 | Larkin et al. | 350/96.20 |
| 4,458,983 | 7/1984 | Roberts | 350/96.20 |
| 4,460,820 | 7/1984 | Matsumoto et al. | 219/385 |
| 4,509,820 | 4/1985 | Murata et al. | 350/96.21 |
| 4,529,265 | 7/1985 | Toya et al. | 350/96.21 |
| 4,557,556 | 12/1985 | Decker, Jr. | 350/96.20 |
| 4,557,557 | 12/1985 | Gleason et al. | 350/96.20 |
| 4,657,343 | 4/1987 | Oldham et al. | 350/96.20 |
| 4,707,069 | 11/1987 | Hoffman | 350/96.20 |
| 4,773,724 | 9/1988 | Bjornlie | 350/96.20 |
| 4,783,137 | 11/1988 | Kosman et al. | 350/96.20 |
| 4,812,008 | 3/1989 | Tokumaru et al. | 350/96.20 |

FOREIGN PATENT DOCUMENTS

| | | |
|---|---|---|
| 121987 | 10/1984 | European Pat. Off. . |
| 159857 | 10/1985 | European Pat. Off. . |
| 2008274 | 5/1979 | United Kingdom . |
| 2041558 | 9/1980 | United Kingdom . |
| 1588227 | 4/1981 | United Kingdom . |
| 1600010 | 10/1981 | United Kingdom . |
| 2087585 | 5/1982 | United Kingdom . |
| 2088653 | 6/1982 | United Kingdom . |
| 2111238 | 6/1983 | United Kingdom . |
| 2141252 | 12/1984 | United Kingdom . |
| 2148537 | 5/1985 | United Kingdom . |
| 2153105 | 8/1985 | United Kingdom . |

OTHER PUBLICATIONS

Examiner's Report to the Comptroller Under Section 17(5), dated 19 Feb. 1987.

Primary Examiner—William L. Sikes
Assistant Examiner—Robert E. Wise
Attorney, Agent, or Firm—Kinney & Lange

[57] ABSTRACT

The connector comprises means (2) defining a bore (4) to receive a bared end portion or portions (20) of an optical fibre cable (16), the means (2) being surrounded by a body (12) of sealant material and a member (10) of heat recoverable material. After insertion of the cable or cables, (16) the member (12) is recovered and compresses the sealant material (10) into intimate contact with the means (2) and cable or cables (16).

13 Claims, 3 Drawing Sheets

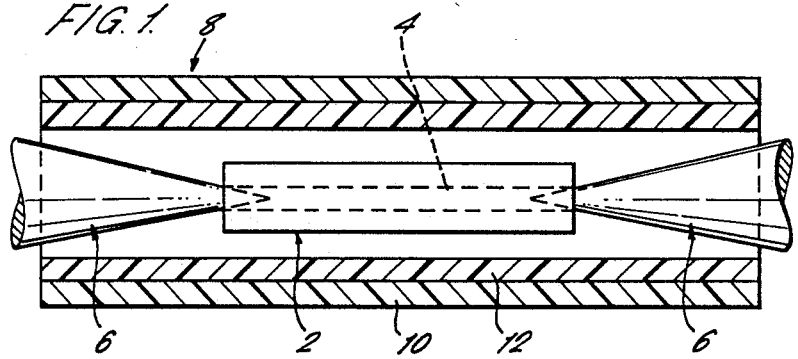
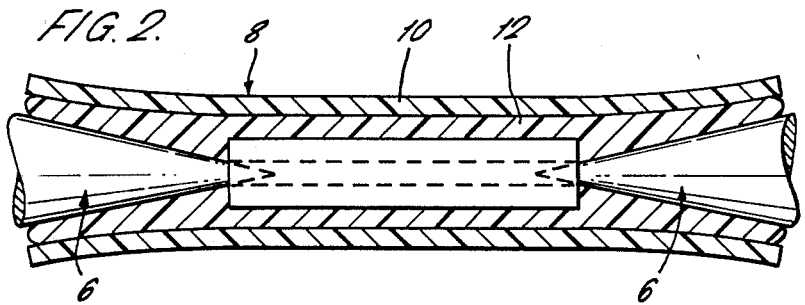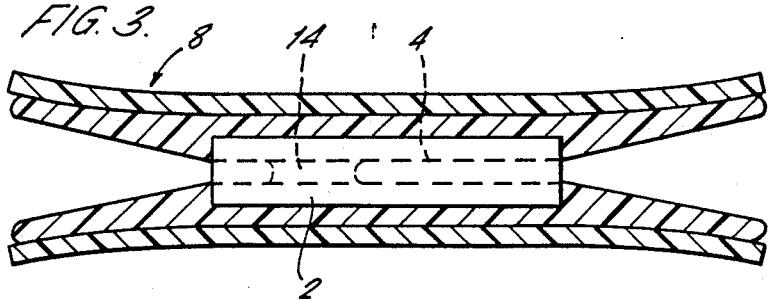

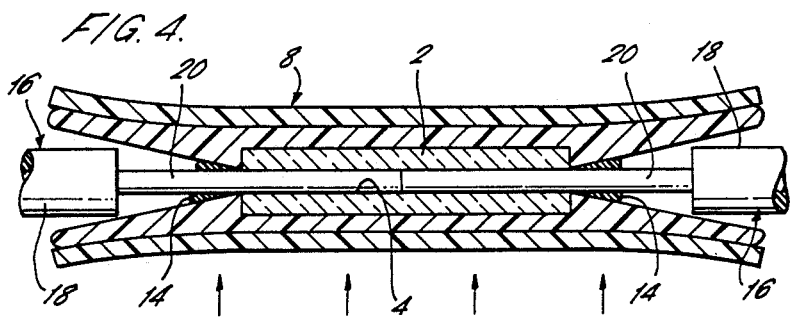
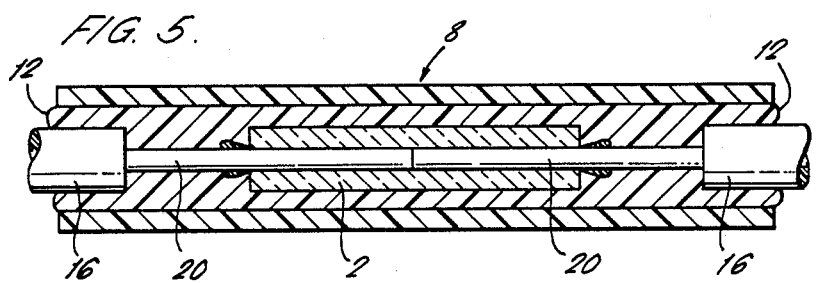

OPTICAL FIBRE CABLE CONNECTOR

This invention relates to an optical fibre cable connector.

It is often necessary to connect an optical fibre cable to another such cable, using a splice connector of either permanent or seperable form, or to a device such as a light transmitter or receiver.

In any such case it is necessary for the cable to be terminated by a connector which is either matable with another connector or with another device, or which itself provides the required connection.

Optical fibres may be connected in a variety of ways involving interconnection of the optical paths of two fibres and the provision of environmental protection around the region of the connection.

The interconnection of the optical paths can be effected by fusion welding together abutting ends of the fibres, or by encapsulating the abutting ends within an adhesive that is curable, for example by the application of ultraviolet radiation thereto. The splicing together of optical fibres with an adhesive can be carried out using a tube having a bore that contains the adhesive, and insertion of the fibre ends into the bore can be facilitated by providing at each tube end a larger opening which gradually tapers down to the cross-section of the bore, as shown in EP-A-0121987, GB-A-1600010, and GB-A-1588227 for example. To effect the splice, the outer coating, layer or jacket (hereinafter referred to simply as "outer jacket" for convenience) is removed from around an end portion of each of the optical fibres so as to leave exposed the core surrounded by its cladding. When the cladding is glass-like, for example silica or doped silica, environmental protection has to be provided to prevent the bared end portions becoming brittle and thus liable to mechanical damage. For optical fibres with a cladding of other materials, mechanical support itself may be advantageous. Such protection may be obtained by inserting not only the bared end portions but also an adjacent portion of the outer jacket into the adhesive, as disclosed in EP-A-0121987, or in an index-matching medium, as disclosed in GB-A-1600010.

However, there is usually an abrupt step where the outer jacket is cut back to expose the cladded fibre, and it has been found in practice that air may be trapped around this region of high physical stress of the optical fibres.

GB-A-2141252 discloses an optical fibre splice connector in which a tube of heat-recoverable material urges two prismatic bodies into contact with two optical fibres retained in a groove therebetween, and a further tube envelopes the first tube and extends over the exposed bare end portions of the fibres and seals on to the outer jackets on each side of the splice.

However, a relatively large volume of air is trapped around the bare fibres between the splice and the jacket sealing region. In this case, as in GB-A-1588227, potentially damaging air has access to the bare fibre in a physically very vulnerable region.

In GB-A-2111238 and GB-A-2148537 there are described splice connectors for joining two optical fibres, comprising a member of heat-recoverable material enclosing a body of sealant material. After location of two optical fibres in a bore in the sealant material the heat recoverable material is recovered and compresses the sealant material about the optical fibres to hold them in the required spliced arrangement.

According to this invention there is provided an optical fibre connector comprising a means defining a bore to receive a bared end portion of an optical fibre cable; a body of sealant material adapted and arranged to guide an optical fibre into said bore; and a member of heat-recoverable material enclosing the body of sealant material, the arrangement being such that after insertion of a bared end portion of an optical fibre into said bore the member of heat-recoverable material is recovered and compresses the body of sealant material into intimate contact with the optical fibre cable and said bore-defining means.

The means defining the bore may be a single member, for example a substantially cylindrical rigid tubular member having the bore therethrough, or it may be two or more members cooperating with each other, for example three or four rods that are arranged to constrain the optical fibres to a specific path therebetween. The bore may have a cross-section other than circular and for example may be defined at least in part by a V-groove. It is also envisaged that the bore may have an open, as opposed to a closed cross-section.

The means defining the bore can be composed of quartz, glass, metal, or a polymer composition, provided that it permits and is not damaged by the desired process for effecting the connection. For example, the member or members defining the bore should be transparent to ultra-violet radiation if a U-V curable adhesive is to be used.

In one convenient arrangement, the bore is provided by a rigid tubular member into which the optical fibre is inserted as a close fit.

The bared end portion of an optical fibre is regarded as a close fit in the bore if the bore is only a few microns larger than the diameter of the optical fibre. For example, for a cladding diameter of 280, 250, 140, 125 microns, the bore diameter would be about 285, 254, 143, 127 microns respectively. In general, the bore diameter should not exceed the cladding diameter by more than 10%, preferably 5%, and most preferably 2%.

Index-matching material, preferably curable adhesive, may be disposed within the bore.

Two optical fibre cable connectors in accordance with the invention will not be described by way of example with reference to the drawings, in which:

FIGS. 1, 2 and 3 show successive stages in the manufacture of one of the connectors;

FIGS. 4 and 5 show two stages in the use of a connector made by the method of FIGS. 1 to 3.

Figure 6:
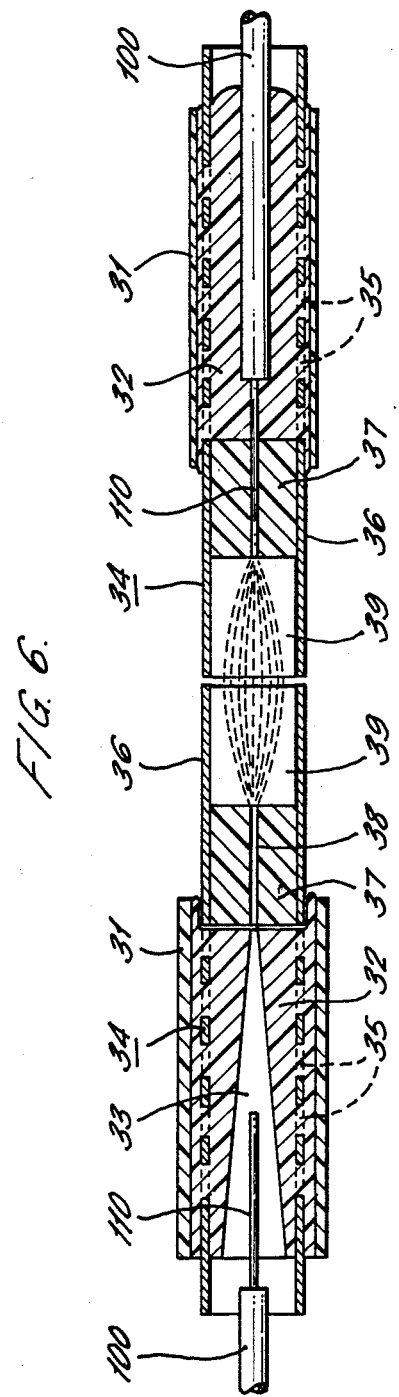
FIG. 6 shows the second connector.

Referring to FIG. 1, a cylindrical quartz capillary tube 2 has a bore 4 of diameter 285 microns therethrough.

Conically tapered mandrels 6 are inserted into respective ends of the bore 4. A sleeve 8 has a cylindrical heat shrinkable polymeric outer component 10 and an inner component 12 of a sealant material that softens and melts as the sleeve 8 is heated to the recovery temperature of the outer component 10. The sleeve 8 is arranged to enclose the capillary tube 2 and the mandrels 6.

Sufficient heat is applied to the sleeve 8 to cause the outer component 10 to recover partially and the inner component 12 of soften, so that, as shown in FIG. 2, the sleeve 8 shrinks into conformity with the underlying capillary tube 2 and mandrels 6. The mandrels 6 are removed when the sleeve 8 splice has cooled sufficiently to stay in place, so as to leave the connector in the configuration shown in FIG. 3. That is to say, the capillary tube 12 is retained within the sleeve 8 and is enclosed within the sealant material 12, and the sleeve 8 forms an inwardly tapering guide at each end of the connector towards the bore 4.

Finally, an ultra-violet curable adhesive 14 is disposed and retained within the bore 4 of the capillary tube 2 to provide an optical fibre splice that is ready for use.

Referring to FIG. 4, two optical fibres 16 are prepared for splicing by having their outer jackets 18 removed at one end to expose the cladded optical fibres 20 whose ends are cleaved, so as to be substantially planar and perpendicular to the fibre axis. The diameter of the cladded fibres 20 is 280 microns. The optical fibres 16 are inserted into respective enlarged ends of the connector so that the tapered inlets thereof guide the bared end portions 20 towards and into the close-fitting bore 4 of the tube 2. The fibres 16 are urged together into abutment within the bore 4, the transparency of the capillary tube 2 and the sleeve 8 allowing such positioning to be noted. Some of the adhesive 14 exudes out of the bore 4 during this process. Ultra-violet radiation is then directed on to the capillary tube 2 through the transparent sleeve 8 so as to cure the adhesive 14 and interconnect the bared end portions 20 of the optical fibres 16.

Heat is then applied to the sleeve 8 to effect its further recovery. Heating is started in the central region around the tube 2 and continues slowly towards each end. As the outer polymeric component 10 softens and shrinks radially, so the inner component 12 softens and is urged to flow under the action of the recovery forces around the tube 2, in particular around its ends from which emerge the fibre end portions 20, and around the fibre outer jackets 18, and in particular around the cut backs from where the fibre end portions 20 emerge. In the latter case, it can be seen that there will be a component of the recovery forces that directs the sealant 12 into the corners at the jacket cut backs.

On completion of the heating, when the sleeve 8 has recovered to its greatest possible extent on to the fibres 16 and tube 2, a fully encapsulated splice is obtained as shown in FIG. 5. It is seen that no part of the fibre end portions 20 is exposed to the atmosphere, they being completely encapsulated within the protective sealant material 12.

The connector specifically described above with reference to FIGS. 1 to 5 is a splice connector having a single member of heat-recoverable material, single body of sealant material, and a single member formed with a through bore to receive two fibres to be spliced, from respective opposite ends.

However, it will be appreciated that the connector of the invention could otherwise be one for mating with another connector or other device, the sealant material being contained at the mating end of the connector by another part of the connector.

While connectors as described above with reference to FIGS. 1 to 5 are satisfactory for many purposes, there are often requirements for a relatively rigid connector, particularly when pairs of such connectors are to be mated in order to join two optical fibre cables.

Referring now to FIG. 6, this shows diagrammatically and in logitudinal section, two connectors according to the invention in a substantially mated condition, the connector on the left being shown in an unassembled condition and the connector on the right being shown in the assembled condition.

Each of the connectors shown comprises a member 31 of heat-recoverable material enclosing a body 32 of sealant material formed with a bore 33 to receive a prepared end portion of an optical fibre cable 100, an end portion 110 of the optical fibre of the cable 100 being exposed. The bore 33 tapers inwardly in the direction of insertion of the cable 100 in order to guide the optical fibre 110 into the required position in the connector.

The body 32 of sealant material is formed about a rigid tubular member 34 of, for example, metal, which extends through the body 32 with the bore 33 substantially on the axis of the tubular member 34. Within the body 32 the tubular member 34 is formed with a plurality of through holes 34 through which the sealant material 32 can pass when softened.

The tubular member 34 extends beyond both ends of the body 32 of sealant material, and also beyond both ends of the member 31 of heat-recoverable material. The portions of the tubular member which extend beyond the ends of the body 32 of sealant material are not formed with holes 35.

The portion 36 of the tubular member 34 which extends beyond the end of the body 32 opposite to the end of insertion of the cable 100 contains a tubular plug member 37 defining a precision bore 38 to receive the optical fibre 110 of the cable 100, and also contains, outwardly of the plug member 37, a gradient-index lens member 39, the bore 38 in the plug member 37 serving to guide the optical fibre 110 to the focal point of the lens member 39. The bore 38 in the plug member 37 is filled with an adhesive material curable by ultraviolet light.

To assemble the connector onto the cable 100, the prepared end of the cable 100 is guided into the body 32 until the exposed optical fibre 110 is received in the bore 38 in the plug member 37, with the leading end of the optical fibre 110 located at the focal point of the lens member 39. The adhesive in the bore 38 is then cured by the application of ultra violet light, preferably through the lens member 39. Heat is then applied to cause the sealant material 32 to soften and the heat-recoverable member 31 to contract to compress the sealant material into intimate contact with the cable 100 and optical fibre 110, as shown in the right-hand connector in the drawing. The sealant material 32 initially between the heat-recoverable member 31 and the tubular member 34 is urged through the holes 35 in the tubular member to serve to fill the remaining bore 33 in the body 32 of sealant material. As shown in the final state the sealant material 32 does not extend beyond the end of the tubular member 34 along the cable 100.

This connector has the advantages that the rigid tubular member 34 serves to support the other components of the connector and can be used as an anchor for any strength members in the cable 100.

Although as described above the adhesive material in the bore 38 of the plug member 37 is cured by the application of light through the lens member 39, as a modification the portion of the tubular member 34 which extends over the bore 38 can be provided with holes 35, and the underlying portion of the plug member 37 provided with aligned holes whereby ultra violet light can be applied to the adhesive in the bore 38 through the aligned holes in the tubular member 34 and the plug member 37.

In the connectors described above the heat-recoverable member comprises a single, tubular member that surrounds the body of sealant material. However, it may otherwise comprise more than one member, for example a plurality of members axially overlapping each other, and the or at least one member may be of wraparound configuration. Advantageously, the body of sealant material and the heat-recoverable member are formed as a coextruded tubular component.

A heat-recoverable material is one the dimensional configuration of which may be made to change appreciably when subjected to a heat treatment. Usually such members recover, on heating, towards an original shape from which they have previously been deformed, but the term "heat-recoverable", as used herein, also includes a member which, on heating, adopts a new configuration, even if it has not been previously deformed.

In their most common form, such members are made from a polymeric material exhibiting the property of elastic or plastic memory as described, for example, in US-A-2027962; US-A-3086242 and US-A-3597372. As is made clear in, for example, US-A-20227962, the original dimensionally heat-stable form may be a transient form in a continuous process in which, for example, an extruded tube is expanded, whilst hot, to a dimensionally heat-unstable form, but in other applications a preformed dimensionally heat stable member is deformed to a dimensionally heat unstable form in a separate stage.

The polymeric material may be cross-linked at any stage in its production that will enhance the desired dimensional recoverability. One manner of producing a heat-recoverable member comprises shaping the polymeric material into the desired heat-stable form, subsequently cross-linking the polymeric material, heating the member to a temperature above the crystalline melting point or, for amorphous materials the softening point, as the case may be, of the polymer, deforming the member, and cooling the member whilst in the deformed state so that the deformed state of the member is retained. In use, since the deformed state of the member is heat-unstable, application of heat will cause the member to assume its original heat-stable shape.

With other members, as described, for example, in GB-A-1440524, an elastomeric member such as an outer tubular member is held in a stretched state by a second member, such as an inner tubular member, which, upon heating, weakens and thus allows the elastomeric member to recover.

The body of sealant material should be capable of achieving a good seal on to the optical fibre and should be capable of excluding water, moisture vapour and other contaminants in the atmosphere from passing therethrough. Conveniently, the sealant material is provided as a coating on at least part, and preferably all, of the inside of the heat-recoverable member. Otherwise the body of sealant material may be provided as a separate component, for example as one or more tubular members for suitable positioning around the optical fibre. The sealant material is such as to be soft at the recovery temperature of the heat-recoverable member, so that it will soften and flow to the extent required to effect the environmental seal of the connector.

We claim:

1. An optical fibre connector including a first member having a portion with a bore defined therein to receive a bared end portion of an optical fibre cable; a body of sealant material on the connector formed with an interior surface to guide an optical fibre into said bore from at least one input end of the first member; and a second member of heat-recoverable material enclosing the body of sealant material, the heat-recoverable material overlapping portions of the first member and an optical fibre after insertion of a bared end thereof into the bore.

2. A connector as claimed in claim 1, in which the body of sealant material has a hole with an inwardly tapering-end portion which serves to guide the optical fibre into said bore.

3. A connector as claimed in claim 1, in which the member of heat recoverable material is tubular.

4. A connector as claimed in claim 1, wherein said first member comprises a rigid tubular member about which the body of sealant material is formed, said bore being substantially on the axis of the rigid tubular member, and the rigid tubular member being formed with a plurality of through holes through which the sealant material can pass, the sealant material between the member of heat-recoverable material and the rigid tubular member being urged through the holes in the tubular member when the connector is heated to the recovery temperature of the heat-recoverable material.

5. A connector as claimed in claim 4, in which the rigid tubular member extends beyond both ends of the body of sealant material.

6. A connector as claimed in claim 5, in which the rigid tubular member extends beyond both ends of the member of heat-recoverable material.

7. A connector as claimed in claim 5, in which those portions of the rigid tubular member which extend beyond the ends of the body of sealant material are not formed with through holes.

8. A connector as claimed in claim 5, in which the bore in the rigid tubular member is located in the portion of a rigid tubular member which extends beyond the end of the body of sealant material opposite to the end of insertion of the optical fibre into said bore.

9. A connector as claimed in claim 4, including a lens member located in the portion of the rigid tubular member which extends beyond the end of the body of sealant material opposite to the end of insertion of the optical fibre into said bore.

10. A connector as claimed in claim 1, said first member bore being a through bore open at both ends to receive bared ends of separate optical fibre cables to provide a splice connection.

11. A connector as claimed in claim 1, in which the sealant material is softenable by heat applied to effect recovery of the member of heat-recoverable material.

12. An optical fibre connector including a tubular member having a portion with a bore having a longitudinal length defined therein of size to receive a bared end portion of an optical fibre cable; a body of sealant material on the connector, said sealant material having an interior passageway generally centered on the bore and formed with a tapered surface from an input end reducing in size toward the bore to guide a bared end portion of an optical fibre cable into the interior passageway and into said bore from said input end, and the body of sealant material at least partially overlapping the tubular member in longitudinal direction, a second member substantially encircling said body of sealant material and at least portions of said tubular member, said second member having the properties of providing compressive forces to the sealant material when heated, said second member overlapping the body of sealant material and tubular member in longitudinal direction.

13. The connector as specified in claim 12 wherein the second member is a heat shrinkable tubing, and at the temperature wherein said heat shrinkable tubing shrinks the sealant material having the properties of softening to permit compression against the optical fibre cable.

* * * * *